(12) United States Patent
Tinseth

(10) Patent No.: US 7,398,187 B2
(45) Date of Patent: Jul. 8, 2008

(54) METHOD OF BATCHING AND ANALYZING OF DATA FROM COMPUTERIZED PROCESS AND CONTROL SYSTEMS

(76) Inventor: Lance David Tinseth, 123 Morgan Creek La., Bozeman, MT (US) 59718

(*) Notice: Subject to any disclaimer, the term of this patent is extended or adjusted under 35 U.S.C. 154(b) by 0 days.

(21) Appl. No.: 11/004,443

(22) Filed: Dec. 4, 2004

(65) Prior Publication Data

US 2006/0122812 A1    Jun. 8, 2006

(51) Int. Cl.
*G06F 15/00* (2006.01)
(52) U.S. Cl. ...................... 702/187; 702/188
(58) Field of Classification Search ................. 702/187, 702/188
See application file for complete search history.

(56) References Cited

U.S. PATENT DOCUMENTS 6,985,831 B2 * 1/2006 Ito et al. ...................... 702/188
2003/0093298 A1 * 5/2003 Hernandez et al. ............. 705/2

* cited by examiner

*Primary Examiner*—John E. Barlow, Jr.
*Assistant Examiner*—Stephen J Cherry
(74) *Attorney, Agent, or Firm*—White-Welker & Welker, LLC

(57) ABSTRACT

System that automatically captures, processes, archives, reports on and distributes data for any computerized equipment at a facility. A single data repository is provided so any authorized user connected to the company/facility network can query secure data. Once data is collected it is batched or grouped according to user-defined rules. A batch is given a distinct number to identify the data. Data is automatically analyzed in near real-time utilizing user-defined modeling code. This code can be simple or complex as needed to compare the batch data against an ideal model. Users can view or trend data and access reports including adding electronic signatures. Additional process information such as standard operating procedures and cycle descriptions may be uploaded and attached to a batch. Any action a user performs that creates, modifies or deletes data in the data repository is audited.

9 Claims, 9 Drawing Sheets

Fig. 1a

| Heading | Description |
|---|---|
| Enterprise | The highest level-represents the company |
| Site | The Enterprise is comprised of a collection of Sites, which represent each physical location |
| Equipment Type | The Site is comprised of a collection of Equipment Types, such as Autoclaves, Lyophilizers, Environmental Monitoring Systems, etc. |
| Process (or Equipment) | Each Equipment Type is comprised of a collection of individual Processes (or individual pieces of equipment). |
| Cycle Type | Each Process is comprised of a collection of Cycle Types. A minimum of one type needs to be specified per Process |
| Recipe | (Optional) Each Cycle Type is comprised of a collection of Recipes. For example, one Cycle Type might have differences (settings unique) for different products |
| Phase | Each Recipe is comprised of a collection of Phases. For example, with a piece of equipment running a Cycle Type for a specific Recipe, there are 4 phases defined: Heat-up, Exposure, Cool-Down, and Return to Ambient |
| Detailed Data (Raw) | Each Phase is comprised of a collection of Detailed (Raw) time-stamped data fields, which defines the RunDetail database schema. Detailed data fields may be different for different phases, recipes, cycle types, or even processes. |
| Summarized Data (post Analysis) | Each Process is comprised of a collection of data that is summarized from the Cycle Type, Recipe, Phase, and Detailed Data (such as Minimum values, Maximum values, Average values, Phase or Run durations, etc.) This defines the RunSummary database schema. Summarized data fields may be different for different phases, recipes, cycle types, or even processes. |
| Alert Limits | Each piece of Summarized Data is comprised of a collection of Alert Limits (typically a Hi Limit, and a Lo Limit) |
| Alarm Limits | Each piece of Summarized Data is comprised of a collection of Alarm Limits (typically a Hi-Hi Limit and a Lo-Lo Limit) |

Fig. 1b

| Log ID | DateTimeStamp | Vessel_Tempterature | Vessel_Pressure |
|---|---|---|---|
| 100 | 7/16/02 11:20:05 | 121.4 | 0.33 |
| 100 | 7/16/02 11:20:10 | 121.6 | 0.22 |
| 100 | 7/16/02 11:20:15 | 122 | 0.35 |
| 100 | 7/16/02 11:20:20 | 121.9 | 0.36 |
| 101 | 7/16/02 11:25:00 | 121.8 | 0.37 |
| | 7/16/02 11:25:05 | 121.1 | 0.38 |
| | 7/16/02 11:25:10 | 121.3 | 0.39 |
| | 7/16/02 11:25:15 | 121.6 | 0.28 |
| | 7/16/02 11:25:20 | 121.5 | 0.39 |
| | 7/16/02 11:25:25 | 121.6 | 0.28 |

METHOD OF BATCHING AND ANALYZING OF DATA FROM COMPUTERIZED PROCESS AND CONTROL SYSTEMS

FEDERALLY SPONSORED RESEARCH

Not Applicable

SEQUENCE LISTING OR PROGRAM

Not Applicable

CROSS REFERENCE TO RELATED APPLICATIONS

Not Applicable

TECHNICAL FIELD OF THE INVENTION

The present invention relates generally to a computer program and method for retrieving, analyzing and reporting on data from computerized systems. More specifically the present invention relates to the batching and analyzing of data from computerized process and control systems used in the manufacture of pharmaceutical products.

BACKGROUND OF THE INVENTION

The present invention was created as a solution to the problems commonly associated with batching, analyzing and viewing data from computerized and process control systems used in the manufacture of pharmaceutical products. Users were required to manually retrieve the data they wished to analyze and then perform complex, time-consuming and error-prone analyzation on that data. Often, different departments required different analyzation reports, further adding to an already complex situation. In some cases, quality issues were not found until weeks later, causing entire product lines to be scratched, and increasing costs.

The present invention consists of modules that allow for the customized batching, analyzation and viewing of data. By linking desktops with critical manufacturing and quality information from across an entire operation, many benefits can be achieved. Users can instantly discern the quality disposition of a batch or process run within seconds. Batch quality can be improved by automatic comparison of process data against recipe requirements, quality attributes and equipment specifications. Available in near real-time, analysis creates department-specific reports for each process and generate run summary data, useful for comparing and analyzing the critical process parameters in a given cycle for a specific piece of equipment over time. Department-specific reports allow each individual unit within the organization the ability to look at the same information, but displayed against the criteria specific to their individual needs. Slowly decaying equipment performance can be found in a matter of minutes by performing statistical analysis on historical data.

SUMMARY OF THE INVENTION

In accordance with the present an organization system is provided which overcomes the aforementioned problems of the prior art. The present invention is a computer program and method for batching, analyzing and viewing data from computerized systems. The present invention is an enterprise system that consists of a "core" application platform and add-on universal modules that allow for customized Process Macro Code or "PMC" to provide for custom analyzation and reporting.

The invention relies on $3^{rd}$ party software to perform the necessary data collection and then automatically batches, archives, analyzes, and delivers to the desktop comprehensive and secure information about manufacturing or laboratory processes.

Once data is collected, it is batched (to indicate a run from start to finish) according to rules defined by the user. A batch is given a distinct, internal number (LogID), which will then be used by the present invention to identify the data.

Once batched, data can be automatically analyzed using process macrocode. This code can be as simple or as complex as needed to provide only the most important details about a batch. This analyzation can occur as frequently as needed and when performed automatically, eliminates the manual processing of data, which is usually complex, time-consuming and extremely prone to error. Analysis is tailored for each process, determining adherence to a pre-determined "model" of the process and creating sub reports at the analysis frequencies. This unique reporting feature allows delivery of process summaries to different groups of email addresses that are selected dynamically by the results of the final analysis (i.e. successful run, problems with run, incomplete run, etc.).

The present invention also incorporates an innovative web interface, called a web portal. The web portal allows any authorized user to view raw or summarized data, identify the status/disposition of a run, access reports, electronically sign reports, and trend historical process data and associated meta data with specific batches. Available process information can be supplemented with equipment pictures, standard operating procedures, cycle descriptions and other information the customer might desire. From any screen, the customer can export information from the present invention to other applications, print it out, or email it to interested parties anywhere. This concept allows a company to realize all the benefits of paperless manufacturing and improved time to market.

The present invention natively incorporates analysis and graphing engines so that process data can be charted and trended for the purpose of Statistical Process Control (SPC). In SPC, the data from a particular manufacturing process is analyzed to determine if various process parameters, such as temperature, air pressure, flow rate, volume, etc. are within certain desirable limits. If there are problems with a particular parameter or process—for example, the temperature does not reach a high enough level to ensure proper sterilization—the batch of product going through that piece of equipment may be out of specification. With an automated data management system like the present invention, a problem can be identified and reported on almost instantaneously, so that it can be addressed right away. This ability to tightly monitor and report upon process parameters makes the present invention a system highly suitable for expediting parametric release of product.

The present invention has CFR21 Part 11 compliance built in. Any action a user performs that creates, modifies or deletes data in the data repository will be audited. Audit events prompt the user to enter comments and allow a user to view the details of the event. Database tables required for the invention are maintained using database tools and are outside the control of the present invention's audit features.

The present invention also has the ability to store Process or PLC based Alerts and Alarms (ones not determined by an analysis process) that may be reported or queried post production. These will have separate database tables defined for each process (this is optional and outside the scope of a normal installation).

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 1a illustrates the standard home page of the present invention;

FIG. 1b illustrates the process data modeling hierarchy of the present invention;

FIG. 2 illustrates a scenario for the active process;

FIG. 7 illustrates the find data tab of the web portal of the present invention;

DETAILED DESCRIPTION OF THE INVENTION

Figure 3:
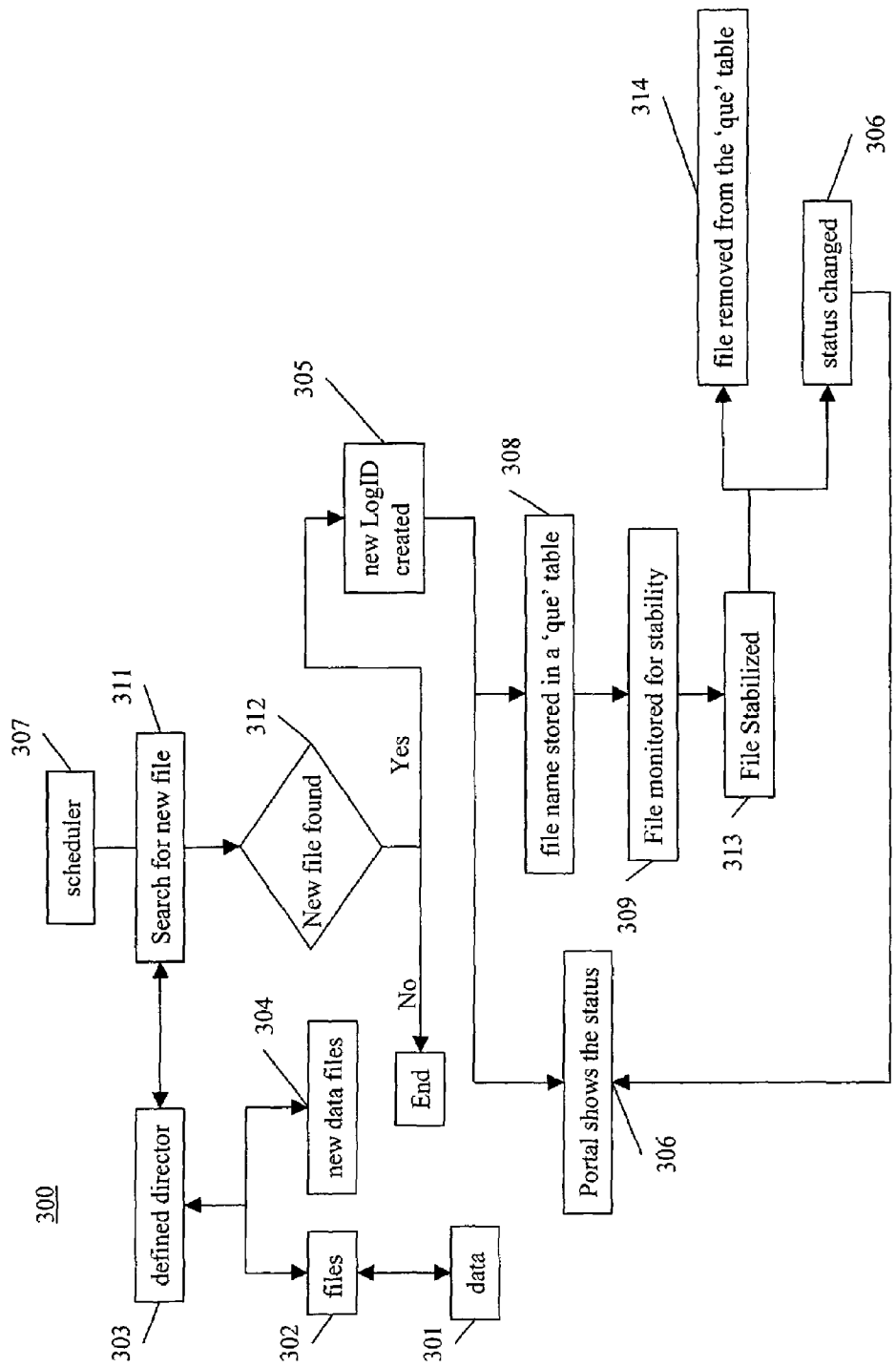
FIG. 3 is a process flow chart for the scenario for the passive process.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1A:
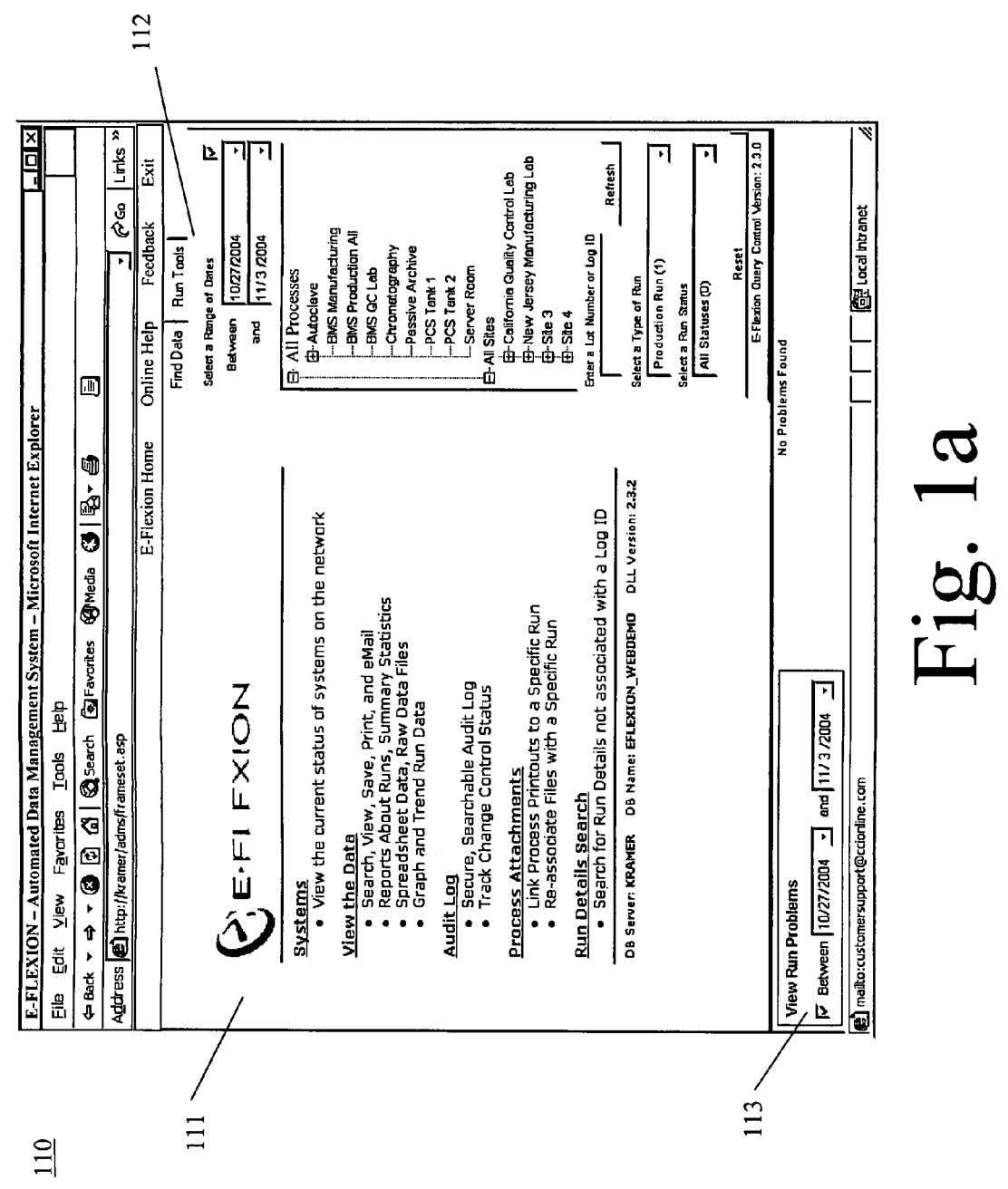

Now referring to FIG. 1 the data modeling hierarchy process (100) of the present invention is illustrated. The enterprise level (101) represents the highest level of a company. The enterprise (101) is comprised of a collection of sites (102), which contain various equipment types (103) each of which have their own respective cycle times (104). Each cycle time (104) is comprised of a recipe (105), which is further defined by a phase (106). Each phase (106) is comprised of a collection of raw data (107), which is then summarized (108) in a post analysis. Each piece of summarized data (108) is comprised of a collection of alert limits (109) and alarm limits (110).

Processes connected to present invention fall into two distinct categories: Passive and Active. A passive process is one that builds and maintains its own data file. For an active process, data is captured directly into the present invention. Each process can be further divided into two categories: archive only and analysis and reporting. Processes are created using an interface to the system, identifying the process type and then completing the required fields for that type of process.

To accommodate the process' data in the system, database tables are created. The run summary tables are designed for either active or passive processes. The main function of these tables is to hold the analyzation results generated by the PMC (i.e. RunDuration, MaxTemp, MinPressure). For passive processes, these tables may also house header-type information gleamed from a data file. Run Details tables are modeled for either Active or Passive processes, and these tables hold the actual data points generated during the run. For Passive processes, a parser populates these tables. For Active processes, $3^{rd}$ party software will populate these tables.

In the passive/archive only capacity, the present invention will serve as an archive system to process data files. Additionally, the users of these systems will have the ability to manually link an electronically captured printout from the system and associate it will a selected data file. A similar feature will allow a user created file to be uploaded and associated with the same data file. The associated file feature for each process can be initially defined to include meta-data fields to assist the user by further defining the data contained in the file to facilitate efficient recognition and classification. No run status information, reports, detailed, or summary data will be generated nor will any statistical charting or trending be available to end users.

In the passive/analysis and reporting capacity, the present invention will deliver all of its features and benefits to the organization. These include but are not limited to: analysis, run status determination, reporting, report dissemination, electronic signatures, viewing/downloading of summary (post analysis) and detailed data (raw data), statistical charting, and statistical trending of selected runs. Additionally, the end users can download all of the data directly to their desktop in various formats. A Universal Parsing Module and Universal Analysis and Reporting module is required to implement this category.

In the active/archive only capacity, the present invention will deliver the same features/benefits as "Passive/Archive Only" but also includes the ability to view/download detailed data (raw data), and perform statistical charting.

In the active/analysis and reporting capacity, the present invention will deliver the same features/benefits as "Passive/Analysis and Reporting". A Universal Analysis and Reporting module is required to implement this category.

With respect to batching, the present invention allows for data to be batched in several ways. For any of these options, the present invention also provides the ability to only batch on certain day(s) of the week. Some of the batching options include: predetermined set start and end times (i.e. batch states at 9:00 AM and ends at 10:30 AM); set intervals between records' date time stamps (i.e. 10 seconds between records) wherein the end of this batch shall be determined by a lapse of time, figured by the interval multiplied by a factor (i.e. the end of the batch occurs when the difference between a set of records is greater than 60 seconds); number of minutes after a specified start time (i.e. every 30 minutes after 10:00 AM); external program that is launched at intervals (i.e. launch Test.EXE every 10 minutes); by the change of a field in a RunDetails table (i.e. when field BatchID changes); letting the process define the start/stop times; number of days after a specified start date (i.e. every 7 days after Oct. 1, 2002); and every month (i.e. Jan., Feb. etc).

With respect to analysis, the present invention allows for analysis of data at different intervals. For either of these options, the present invention also provide the ability to only analyze on certain day(s) of the week; set intervals (every X minutes), and set times of the day (up to 4 fixed times). Analysis consists not only of determining the value of certain parameters during a run but also includes setting the status of a run based on the values of those parameters.

The present invention currently supports nine statuses: a run set to 'File Found' indicates a data file has been located and is being monitored for stability; a run set to 'Run Queued' indicates a data file is ready for further processing; a run set to 'Run OK' indicates analysis has determined all tests were passed successfully; a run set to 'Run Ignored' indicates that the data is not to be used when trending/graphing; a run set to 'Run Incomplete' indicates analysis has determined key components or data was missing; a run set to 'Run Problems' indicates analysis has determined all tests failed; a run set to 'Data System Problems' status indicates an internal error has occurred when processing a run; a run set to 'File Archived' indicates data has been batched or a data file has been archived and no further processing is required; and a run set to 'Borderline' indicates analysis has determined some tests failed and some passed.

With respect to viewing, the present invention provides the ability to view the data in different ways by utilizing the filters wherein runs are automatically color-coded based on their status. A sample list of different queries would include: run status, by date/time of run, site, category, lab, type, LogID (find all runs that are associated with a specific LogID), and Batch ID (find all runs that are associated with a specific BatchID).

Figure 6:
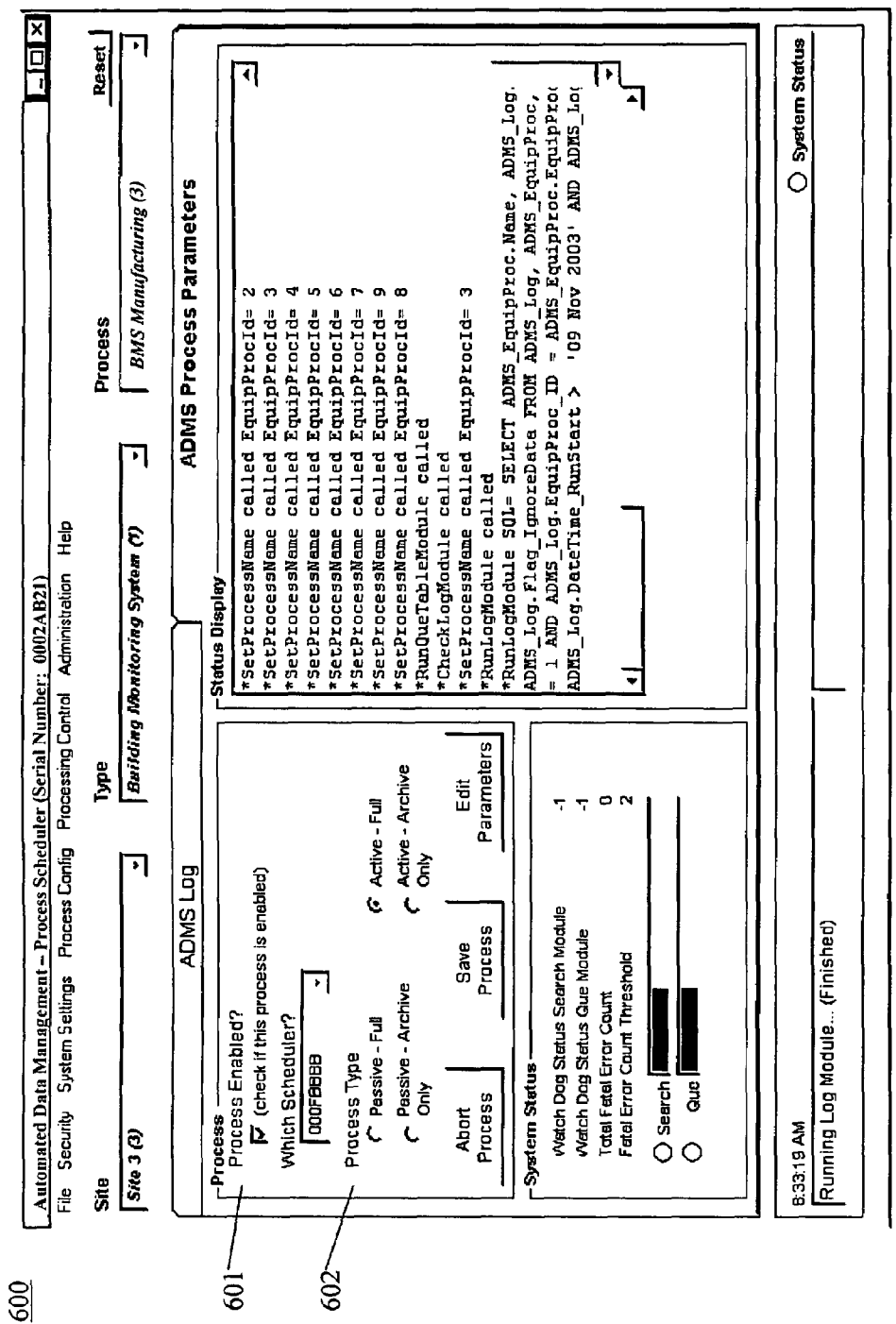
FIG. 6 illustrates the ADMS process parameters window of one embodiment of the present invention.

Now referring to FIG. 6, in another embodiment of the present invention a process scheduler (600) is included. The process scheduler (600) is an "engine" that will continually search, collect, and catalog data for enabled processes. The process scheduler (600) also supervises the triggering of data parsing and analysis for processes configured for full analyzation and reporting. Process administration, user administration and audit trail functions are accessed within the process scheduler (600). Processes (600) can be either enabled or disabled (601) at the users discretion. A user may also select the process type (602) from both a full time passive or active mode and an archive only setting for both modes.

In yet another embodiment of the present invention, a Web Portal is incorporated to provide quick, one-click access to specific functions of the system including: an overview and description of the system scope and purpose; a systems status list detailing what processes are connected to the system of the present invention; the ability to view the (raw) data; a detailed summary of data, search, print, e-mail, generate reports, summary statistics, spreadsheet data, graphing and trending; electronically sign reports; view and search audit log information and change control status; associate files (meta data) with a run; and perform run details search(es) for information not associated with a Log ID.

In still another embodiment of the present invention a Universal Analysis and Reporting Module may be utilized. This module incorporates the FooBasic processing engine allowing a user to create Process Macro Code (PMC) to model process data in the system of the present invention data repository. This modeling may include examining low, high or average values, generating data quality alerts and alarms, calculating cycle duration or feeding the data through a custom equation or logic. The output of the analysis is stored as process summary information that can be displayed, searched and downloaded from the web portal. Additionally, a user has the ability to prepare a summary report detailing critical values from the results of the analysis. This custom report can be automatically e-mailed to appropriate personnel.

In yet another embodiment a Universal Parsing Module, also incorporating the FooBasic processing engine, may be present. This module is used to transform data from data files into the system of the present invention's data repository. An Integrated Development Environment (IDE) allows rapidly building and testing data transformation code (PMC). Additional code can read general header information, report on file errors or corruption, and read alarm information contained in the files.

In yet another embodiment of the present invention a Security ActiveX Control for Industrial HMIs may be used. This component ties industrial HMI applications to the present invention's security system. It provides HMI's with Engineer, Supervisor, and Operator administration levels while providing all the robust security features native to present invention.

In another embodiment of the present invention a Web Portal Advanced Search Add-In module is incorporate to the system of the present invention. This additional module allows the user to perform an advanced search of the Associated Files, Associated File Details, Operator Comments, Run Summary Results, and Raw Data Files. Authorized users also have the ability to search the Audit Logs for Operator Comments and Detailed Audit information. The user has the ability to filter the results by date range, process, keywords, query type (all words, any words, exact match), and the number of records to return. Once the results are returned to the user, the detailed information about the record can be viewed with a single mouse click. The user has the ability to enter any number of keywords including log ID's, lot numbers, operator names, or any other process specific information.

In a generic example of the system's logic, approximately every minute the system searches the database, looking for enabled passive and active processes.

For each passive process that is found, the corresponding file location is scanned for new files that have been collected. If the file requires parsing, UPM is launched, which will then run the correct code that parses the file, storing the data in the database. Once that is complete, the system determines if analyzation is required for the process and if so, will launch UARM, running the correct analyzation code for the process.

For each active process that is found, the system batches any new data found in the database and then, if required, launches the correct analyzation for the code.

Now referring to FIG. 2 where a scenario for the active process is presented. Assume the scheduler (307) last processed log ID 100 (201) and new data enters database (from data collection). The scheduler (307) grabs the next section of records and initiates its batching algorithm starting with the last known record. The scheduler (307) then moves through each record and examines it (based on batching criteria selected) to discover if the new data found should be considered a new process run.

For this example, it is assumed batches are based on a 5 second difference in date-time with a 1 minute difference denoting a new batch. The Scheduler (307) compares the record at 11:25:00 (202) against the record at 11:20:20 (203), determines the difference in date-time is greater than 1 minute and therefore, the record at 11:25:00 (202) should begin a new batch (i.e. a new LogID). The Scheduler (307) generates a new LogID (204), stamps that on the 11:25:00 record (201), continues to the 11:25:05 record (202) and performs the same logic. In this case, the 11:25:05 record (202) is within the 5-second differential from the 11:25:00 (201) record so it should have the same LogID (201). This logic continues through the set of records.

Each time a new LogID (204) is required, the Scheduler (307) updates the database for the old LogID (203), setting the end time for the run and changing the run type from 'Active Production Run' to 'Production Run', letting users know that the run has completed.

In this example, analysis would be performed against LogID 100 (203) to determine the final status of the run and to note that further analysis of this run is not required. LogID 101 (201) would also be analyzed to determine an initial state and to note that further analysis is required since it's unclear if the run has ended or not.

Now referring to FIG. 3, with respect to the scenario for a passive process (300) wherein data (301) exists in files (302). In step 311, the scheduler (307) searches the defined directory (303) for new data files (304). In step 312, when a new file (304) is found, the scheduler (307) creates a new LogID (305) for the new file (304) since the file itself denotes a run or batch and the file name (305) is then stored in a 'que' table (308) while it is monitored for stability (309). At this point, the Portal shows the status (306) of the run as 'Still In-Progress'. Once stabilized (313), the scheduler (307) removes the file (304) from the 'que' table (314) and changes the status (306) to 'Waiting for Run Processing'. The scheduler (307) launches UPM to parse the file (304) thereby adding the contents of the file (304) to the database (306). The parser would proceed through the file (304), line by line, retrieving the necessary information and adding it to the database (306). Each line of the file would be tied to the same LogID (305).

Once the scheduler (307) has finished parsing this file (304), it sets the end time for the run but doesn't need to change the run type as it started as a 'Production Run' and will finish as a 'Production Run'. The scheduler (307) then launches UARM for this run, performing analysis to determine the final status of the run and to note that further analysis of this run is not required.

Figure 4:
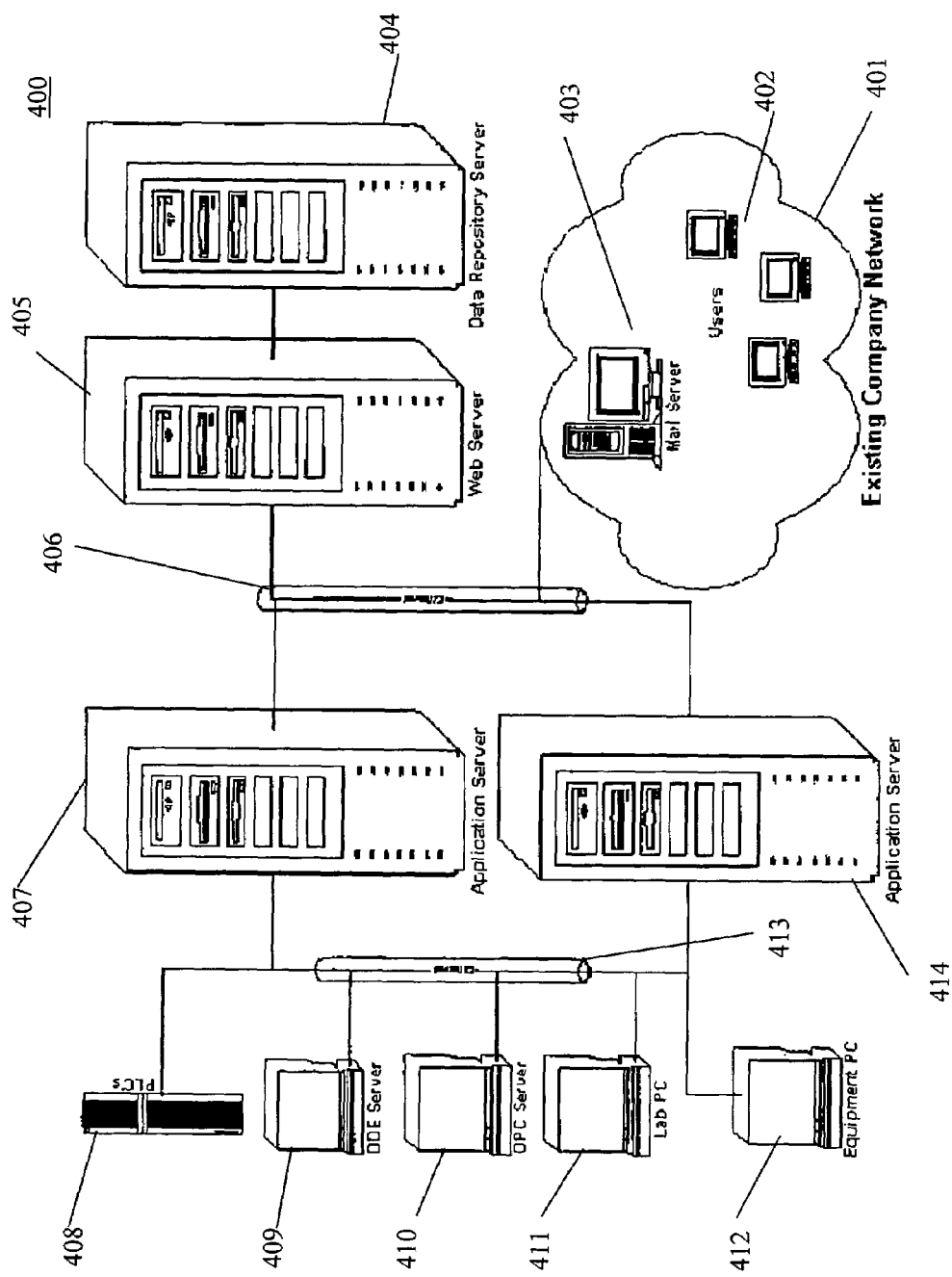
FIG. 4 illustrates the automated data management system web portal of the present invention.

Now referring to FIG. 4, a general overview of a typical Automated Data Management System (also referred to as "ADMS") Web Portal infrastructure (400) is illustrated. An existing company network (401) comprised of a plurality of users (402) and a mail server (403) is connected by a first router/switch (406) to a web server (405), data repository server (404), application servers (407 & 414). Application servers (407 & 414) are connected through a second router/switch (413) to PLCs (408), DDE server (409), OPC Server (410), lab PC (411), and an equipment PC (412).

FIG. 1a illustrates the standard Home Page (110) of the present invention. The web site is organized into a basic window structure with three focus areas. These areas are: Main Menu (111), Find Data Tab and Results Grid (112), and View Run Problems (113).

By using the Web Portal, authorized local (404) and remote users (407) are provided the tools to: upload/download additional files that may be associated with a specific run; view, save, print, and email raw and summarized production run data; view and submit comments about production run; create graphs and statistical charts based on data from individual runs or analytical parameters from multiple runs; and view 21CFR Part 11 compliant electronic records and audit log records.

Figure 5:
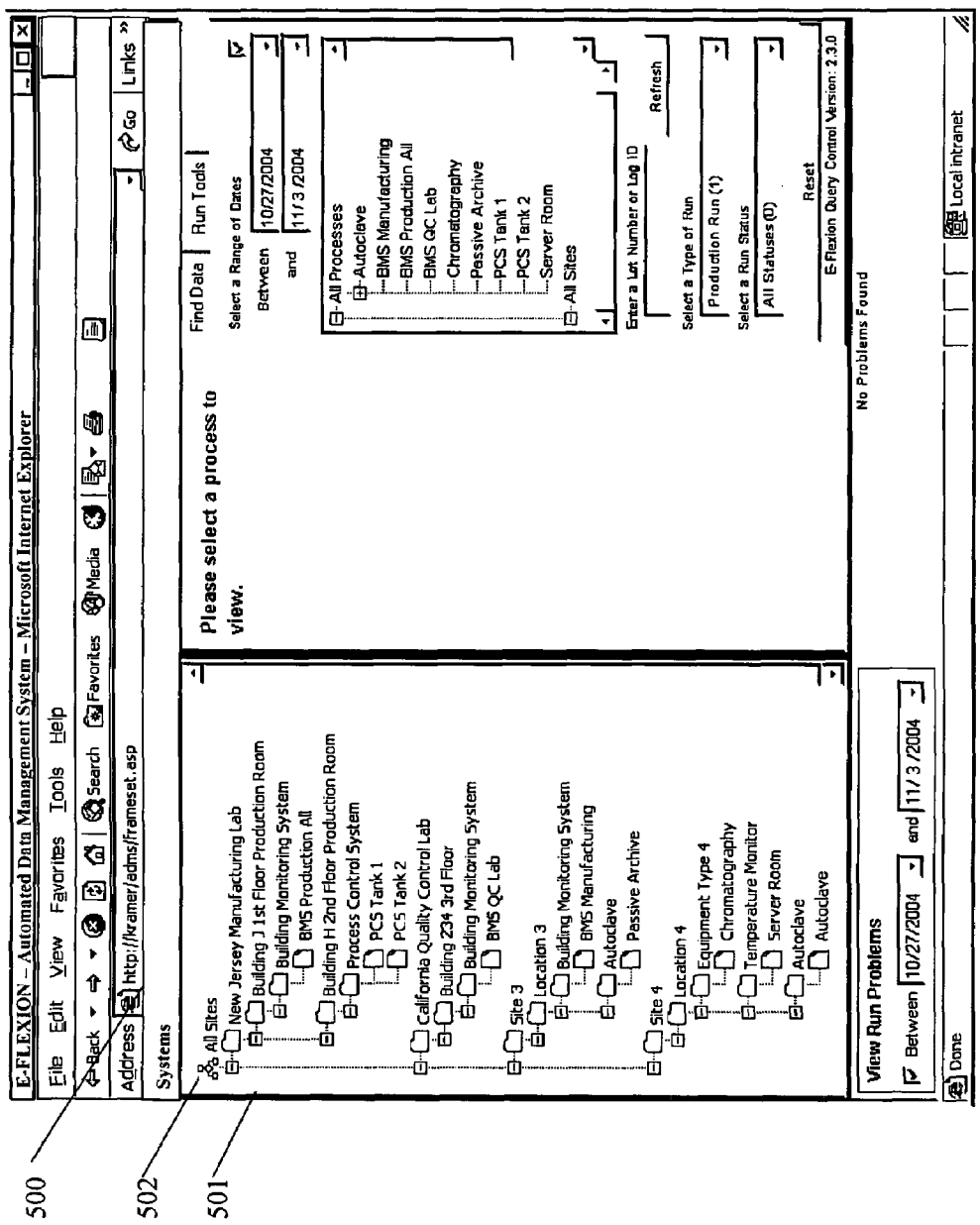
FIG. 5 is a screen shot of a browser pane illustrating a typical graphical user interface that may be used to enable the present invention.

Now referring to FIG. 5, when a user first opens the graphical user interface, the user will see a menu in the left pane (501) of the browser window (500). This is a typical menu (502) used to enable the present invention. The menu (502) provides quick, one-click access to all the different tools within the present invention. The Web Portal displays the run type and run status for every stage of every run.

By selecting Systems, View the Data, Audit Log, Process Attachments, or Run Details Search, a user can obtain any analyzed data. The Systems section of the Web Portal allows a user to view information pertaining to current systems on the network. By selecting a system the user can view various information pertaining to that system such as: Process Name, Equipment Site, Equipment Lab, Equipment Type, Contact Person, Process Status, Process Type, Last checked for data, Last Log ID, and Last Date/Time Stamp.

The View the Data section of the Web Portal provides users with the ability to interact with the actual data that has been captured and/or processed from the production equipment. When a user selects View The Data a Run Summary Data screen will appear. By default, this screen, which is not illustrated, shows the previous week of runs. If there were no runs during the previous week, the table will be empty.

In order to be allowed access to the Audit Log section of the present invention, a user must have a logon identification and password that have been given audit log rights. The Audit Log section of the Web Portal provides detailed records of all Add, Modify, and Delete events that occur during the normal operation of the system. The Audit Log selection tools allow authorized users to narrow down the list of all Audit Log records to isolate only those records of interest. As a default, all Audit Log entries for the past week are automatically displayed. Audit Log entries will update in the grid window as selection criteria are modified. Rows in the grid window are color-coded for easy distinction.

In order to be allowed access to the Process Attachments section of the present invention, a user must have an authorized user identification logon and password. The Process Attachments section of the Web Portal gives a user the option to link files with a specific run. An example of a 'Process Attachment' would be any printout (e.g. graphs or reports) generated by a PC and converted to a PDF file (portable document format) by the Process Scheduler (307). Any authorized user (with 'Associate Files' permissions) has the ability to link files with any particular run.

The Run Details Search Screen feature was designed for the sole purpose of finding records that do not have a Log ID. Since most records will have a Log ID, the Find Data Tab should be the first method of searching for records. In some cases, when the data pulled is outside the scope of a run, there may be records that were not assigned a Log ID number. In the Run Details Search window, the user can choose to search a specific process, location/table, and/or a date range and time range down to the second. After the search is complete the user has the option to save the information to a file and or print it out.

Figure 7:
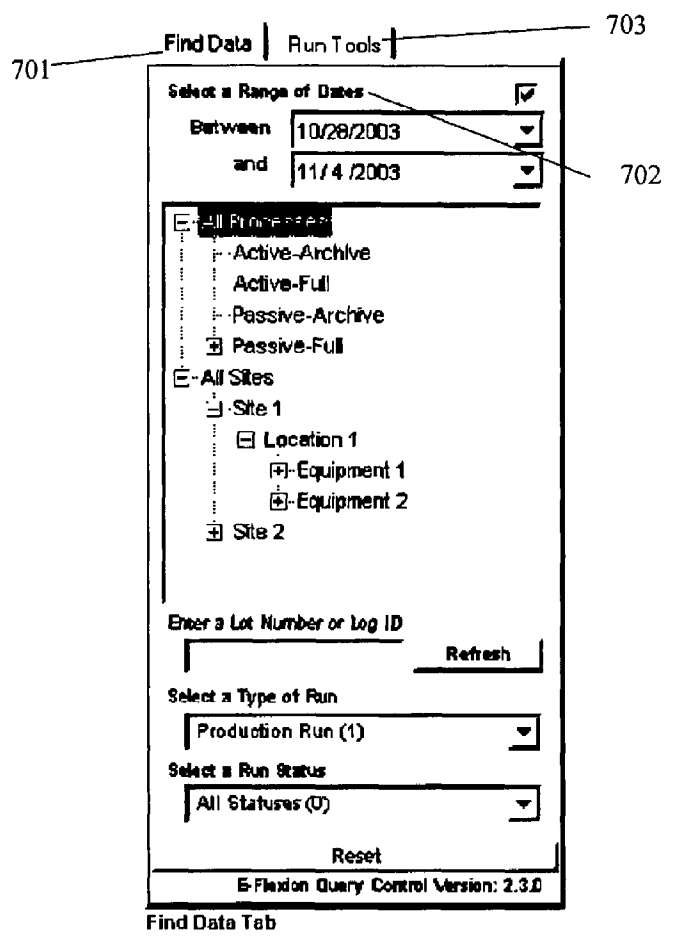

Now referring to FIG. 7, on the right hand side of the browser window (500) is the Find Data tab (701). This tab (701) contains the selection criteria (702) used to select specific runs of interest. The Run Tools tab (703) is visible in the window (700) but will not be active until a specific run is selected.

Figure 8:
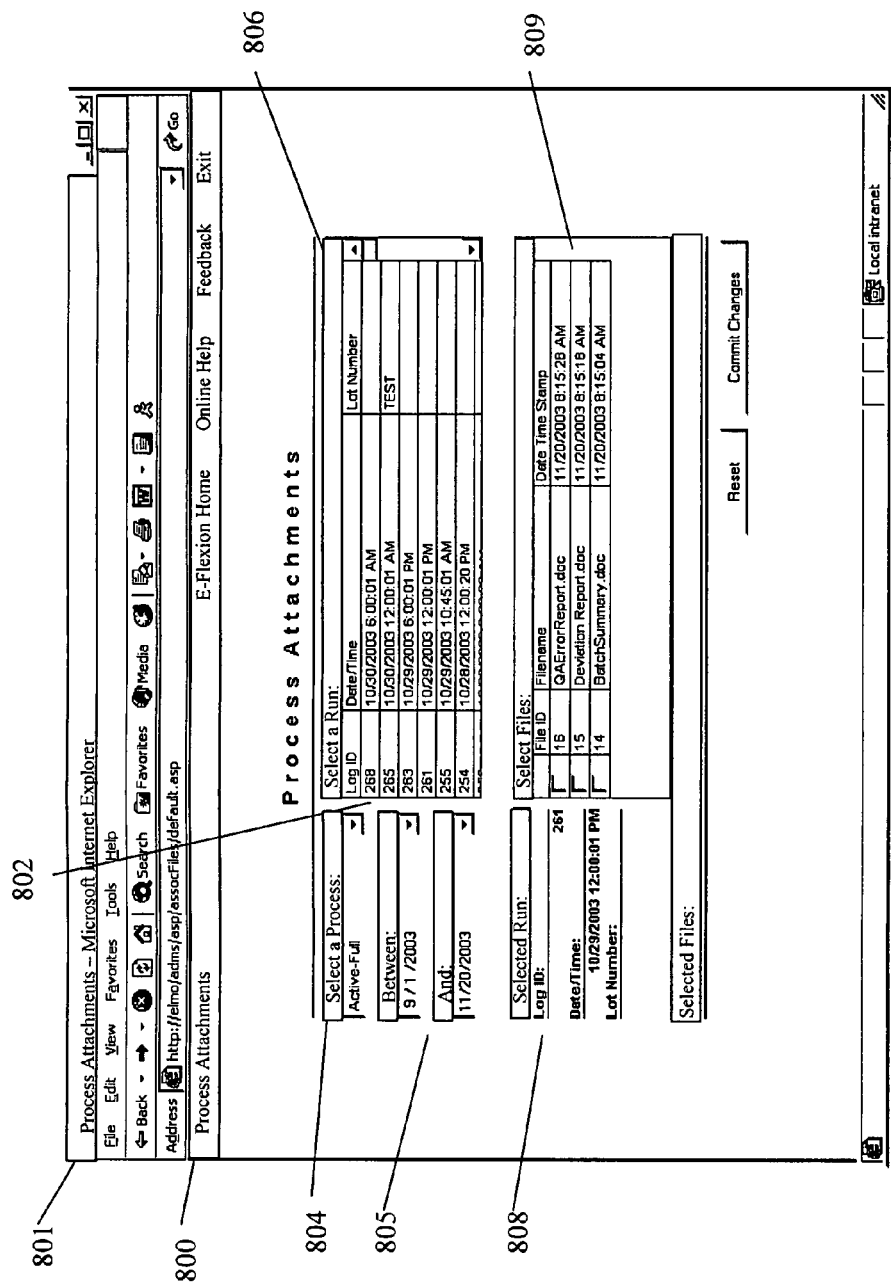
FIG. 8 illustrates the process attachments selection screen of the present invention.

Now referring to FIG. 8, the Process Attachments section (800) of the Web Portal (801) gives a user the option to link files with a log record (802). Any authorized user (with 'Associate Files' permissions) has the ability to link files with any particular run. When the Process Attachments option is selected, the user must first log in. After successfully logging in, the Process Attachments screen (800) appears and allows the user to select any process (804) and a date range (805) to search. The upper frame (806) of the screen (801) shows all the corresponding log records (802) for the selected process (804) and date range (805). The lower frame (808) shows all of the un-linked files (809) for the given process (804). The user has the ability to select a run from the upper frame (806) and then select which un-linked files (809) should be linked with the selected log record (802). After selecting which files to link, the user can either reset the search parameters or commit changes.

The run details search feature was designed for the sole purpose of finding records that do not have a Log ID. Since most records will have a log ID, the Find Data Tab should be the first method of searching for records. In some cases, when the data pulled is outside the scope of a run, there may be records that were not assigned a log ID number. In this window, the user can choose to search a specific process by using table, and dates and times down to the second, as search parameters. By default, the Show All Records box is not checked. This ensures that only records without a log ID will be shown. If the box is checked, all records within the search parameters will show regardless of whether they have a log ID or not. Records without a log ID will be displayed in a different color. After the search is complete the user has the option to save the information to a file and or print it out.

Audit Log events that require Computer System Validation (CSV) updates via Change Control will automatically set the Change Control Required flag to True, and the Change Control Completed flag to False. Users that generate Audit Log entries that require change control (such as modifying process parameters through the Process Scheduler (307) application) are responsible for updating the system documentation through normal CSV Change Control procedures. After system documentation has been updated, the user must instruct the ADMS that Change Control has been completed. This is accomplished from the Audit Log Option from the Web Portal Home Page. Users must enter an authorized Username and Password and select a record to update from the list shown. From the Audit Log Details window, users must select the "Enter Change Control Status" button. Users must enter an authorized username and password and check the Change Control Completed? check-box. Users are encouraged to enter comments (e.g., Change Control Protocol #, Date Completed, etc.) about the procedure. Users must then click the Submit Change Control Status button to submit this information. Submission is not possible unless the Change Control Completed box is checked. A message will indicate whether or not submission was successful. It is not possible to reset the completion status to false and comments entered about the change control can immediately be viewed at the end of the Audit Log Details report.

A view data feature is activated by clicking on the View the Data in the Main Menu or by selecting any option on the Find Data tab (located on the right portion of the screen). Once selected, View the Data will search the database for all runs meeting the criteria specified on the Find Data tab. The search results are displayed on the left portion of the screen. Initially, only the Find Data tab will be active. When a user selects an individual record from the grid, the Run Tools tab will become active. If a user selects a specific process, and records meeting the criteria for trending are met, a Trending button will be displayed at the bottom of the results grid. The individual records are highlighted in various colors denoting the status of the run. The legend at the top of the screen denotes the meaning of each color of the run. Column headings are as defined: Lot # (LogID)—The lot number and/or Log ID of a run; Date/Time—The date and time that the run began; Process—The name of the process; Type of Run—As defined in the ADMS_RunType table; Signed—If the run has been electronically signed (written report) a check mark will be displayed (this column can be removed by the administrator during configuration); Comments—If comments have been entered with regards to this Lot #, a check mark will be displayed (this column can be removed by the administrator during configuration); File Name—The name of the data file for a passive process (this column can be removed by the administrator during configuration).

At the bottom of the Home Page is a section used only to display "problem runs"—runs in which at least one abnormal problem was detected and reported. The View Run Problems section of the Web Portal provides a quick, one-click access to all runs that have any sort of problem. Through View Run Problems, users can quickly find the problem runs, access all data about those runs, read comments submitted about the problems, etc. The list of run problems refreshes itself every 30 seconds so it is always up-to-date.

The View Run Problem window date controls will (by default) display production run problems detected over the past 7 days. The date range can be changed using the pull-down calendar controls. Users can view all problem runs by simply un-checking the date range check-box. If no runs are found for the specified date range, the right side of the View Run Problems window will show the text: "No Problems Found". If problem runs are found, the right side of the View Run Problems window will display a scrollable listing of all runs that meet the date criteria. Clicking any row to the left of the Comments column will open the Written Report from the Run Tools tab (as discussed in Written Report of Run). If a row displays the hyperlink in the Comments column, clicking on this link will open the Comments report for that run from the Run Tools tab.

It is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The invention claimed is:

1. A system for batching and analyzing data from computerized and process control systems comprising:
   a web server;
   a web portal interface;
   a multi-user network;
   an application server;
   a process scheduler with means to control security and access to said application server;
   a data repository installed within a pre-existing network and infrastructure for;
   automatically collecting, batching, archving, analyzing data;
   delivering data to a desktop computer;
   storing data in a single repository;
   performing a comprehensive analysis against specifications supplied by a user via said web portal interface;
   automatically disseminating results via email, wherein available process information is supplemented with additional information;

said web portal interface providing means for a user to export information to other applications, prints out said information, or emails said information to interested parties;

analysis and graphing engines process data that is charted and trended;

a passive system that builds and maintains its own data file; and an archive system to process data files wherein the user has the ability to manually link an electronically captured printout from the system and associate it with a selected data file.

2. The system of batching and analyzing data from computerized and process control systems of claim 1 further comprising a Universal Parsing Module and Universal Analysis and Reporting module which enables;

additional functionality including: analysis, run status determination, reporting, report dissemination, electronic signatures, viewing and downloading of summary and detailed data statistical charting, and statistical trending of selected runs; and said web portal interface providing means for a user to download all of the data directly to their desktop computer in various formats.

3. A system for batching and analyzing data from computerized and process control systems comprising:

a web server;
a web portal interface;
a multi-user network;
an application server;
a process scheduler with means to control security and access to said application server;
a data repository installed within a pre-existing network and infrastructure for;
automatically collecting, batching, archving, analyzing data;
delivering data to a desktop computer;
storing data in a single repository;
performing a comprehensive analysis against specifications supplied by a user via said web portal interface;
automatically disseminating results via email, wherein
available process information is supplemented with additional information;
said web portal interface providing means for a user to export information to other applications, prints out said information, or emails said information to interested parties;
analysis and graphing engines process data that is charted and trended;
an active system wherein data is captured directly;
said web portal interface providing means for a user to view and download detailed data and perform statistical charting; and
a Universal Analysis and Reporting module which enables;
additional functionality including: analysis, run status determination, reporting, report dissemination, electronic signatures, viewing and downloading of summary and detailed data statistical charting, and statistical trending of selected runs; and
said web portal interface providing means for a user to download all of the data directly to their desktop computer in various formats.

4. A system for batching and analyzing data from computerized and process control systems comprising:
a web server;
a web portal interface;
a multi-user network;
an application server;
a process scheduler with means to control security and access to said application server;
a data repository installed within a pre-existing network and infrastructure for;
automatically collecting, batching, archving, analyzing data;
delivering data to a desktop computer;
storing data in a single repository;
performing a comprehensive analysis against specifications supplied by a user via said web portal interface;
automatically disseminating results via email, wherein
available process information is supplemented with additional information;
said web portal interface providing means for a user to export information to other applications, prints out said information, or emails said information to interested parties;
analysis and graphing engines process data that is charted and trended; and
an audit log wherein users;
view audited events for any records in the system, change control status;
monitor a change control status;
enter comments about said change control status; and
view a detailed report of the audit log and comments entered therein.

5. A system for batching and analyzing data from computerized and process control systems comprising:
a web server;
a web portal interface;
a multi-user network;
an application server;
a process scheduler with means to control security and access to said application server;
a data repository installed within a pre-existing network and infrastructure for;
automatically collecting, batching, archving, analyzing data;
delivering data to a desktop computer;
storing data in a single repository;
performing a comprehensive analysis against specifications supplied by a user via said web portal interface;
automatically disseminating results via email, wherein
available process information is supplemented with additional information;
said web portal interface providing means for a user to export information to other applications, prints out said information, or emails said information to interested parties;
analysis and graphing engines process data that is charted and trended; and
a web portal accessible to remote users through a multi-user network wherein remote users are provided the tools to:
upload or download additional files that may be associated with a specific run;
view, save, print, and email raw and summarized production run data;
view and submit comments about production run;
create graphs and statistical charts based on data from individual runs or analytical parameters from multiple runs; and
view compliant electronic records and audit log records.

6. A system for batching and analyzing data from computerized and process control systems comprising:
a web server;

a web portal interface;
a multi-user network;
an application server;
a process scheduler with means to control security and access to said application server;
a data repository located on a network for;
  automatically collecting, batching, archiving, analyzing data;
  delivering data to a desktop computer;
  storing data in a single repository;
  performing a comprehensive analysis against specifications supplied by a user via said web portal interface;
  automatically disseminating results via email, wherein
available process information is supplemented with additional information;
said web portal interface providing means for a user to export information to other applications, prints out said information, or emails said information to interested parties;
analysis and graphing engines process data that is charted and trended;
a passive system that builds and maintains its own data file; and
an archive system to process data files providing means to manually link an electronically captured printout from the system and associate it with a selected data file.

7. The system of batching and analyzing data from computerized and process control systems of claim 6 further comprising a Universal Parsing Module and Universal Analysis and Reporting module which enables;
  additional functionality including: analysis, run status determination, reporting, report dissemination, electronic signatures, viewing/downloading of summary and detailed data statistical charting, and statistical trending of selected runs; and
  said web portal interface providing means for a user to download all of the data directly to their desktop computer in various formats.

8. A system for batching and analyzing data from computerized and process control systems comprising:
  a web server;
  a web portal interface;
  a multi-user network;
  an application server;
  a process scheduler with means to control security and access to said application server;
  a data repository located on a network for;
    automatically collecting, batching, archiving, analyzing data;
    delivering data to a desktop computer;
    storing data in a single repository;
    performing a comprehensive analysis against specifications supplied by a user via said web portal interface;
    automatically disseminating results via email, wherein
  available process information is supplemented with additional information;
  said web portal interface providing means for a user to export information to other applications, prints out said information, or emails said information to interested parties;
  analysis and graphing engines process data that is charted and trended; and
  an audit log wherein users:
    view audited events for any records in the system, change control status;
    monitor a change control status;
    enter comments about said change control status; and
    view a detailed report of the audit log and comments entered therein.

9. A system for batching and analyzing data from computerized and process control systems comprising:
  a web server;
  a web portal interface;
  a multi-user network;
  an application server;
  a process scheduler with means to control security and access to said application server;
  a data repository located on a network for;
    automatically collecting, batching, archiving, analyzing data;
    delivering data to a desktop computer;
    storing data in a single repository;
    performing a comprehensive analysis against specifications supplied by a user via said web portal interface;
    automatically disseminating results via email, wherein
  available process information is supplemented with additional information;
  said web portal interface providing means for a user to export information to other applications, prints out said information, or emails said information to interested parties; and
  analysis and graphing engines process data that is charted and trended; and
  web portal accessible to remote users through a multi-user network wherein remote users are provided the tools to:
    upload or download additional files that may be associated with a specific run;
    view, save, print, and email raw and summarized production run data;
    view and submit comments about production run;
    create graphs and statistical charts based on data from individual runs or analytical parameters from multiple runs; and
  view compliant electronic records and audit log records.

* * * * *